United States Patent [19]
Corazza

[11] Patent Number: 5,190,705
[45] Date of Patent: Mar. 2, 1993

[54] METHOD FOR LINING LARGE-DIAMETER PIPES

[76] Inventor: Leo Corazza, Sonnenbergstrasse 52, CH-9030 Abtwil, Switzerland

[21] Appl. No.: 759,218

[22] Filed: Sep. 13, 1991

[30] Foreign Application Priority Data

Sep. 14, 1990 [CH] Switzerland ............ 02975/90

[51] Int. Cl.⁵ ............ B28B 1/16; B32B 31/06; B32B 35/00; F16L 55/18
[52] U.S. Cl. ............ 264/36; 138/97; 156/94; 156/98; 156/294; 264/33; 264/34; 264/35; 264/256; 264/262; 264/263; 264/265; 264/308; 264/334; 405/154; 405/155; 427/140
[58] Field of Search ............ 264/31–35, 264/333, 36, 261, 262, 263, 265, 279, 334, 154, 155, 256, 308; 156/94, 98, 294; 138/97; 405/154, 155; 427/140

[56] References Cited

U.S. PATENT DOCUMENTS

| | | | |
|---|---|---|---|
| 545,978 | 9/1895 | Ransome | 264/33 |
| 820,747 | 5/1906 | Tucker | 264/33 |
| 1,867,837 | 7/1932 | Jackson | 264/33 |
| 2,144,013 | 1/1939 | Donaldson | 264/34 |
| 2,264,054 | 11/1941 | Sarosdy | 264/33 |
| 3,662,045 | 5/1972 | Tierling | 264/36 X |
| 3,996,967 | 12/1976 | Takada | 156/94 X |
| 4,325,772 | 4/1982 | Suetoshi et al. | 156/94 X |
| 4,496,499 | 1/1985 | Brittain et al. | 156/94 X |
| 4,678,370 | 7/1987 | Allen | 138/97 X |
| 4,728,223 | 3/1988 | Rice | 138/97 X |
| 4,820,458 | 4/1989 | Babendererde et al. | 264/34 |
| 4,956,032 | 9/1990 | Hahn et al. | 264/36 X |
| 5,032,197 | 7/1991 | Trimble | 264/36 X |
| 5,063,967 | 11/1991 | Stephens | 138/97 X |

FOREIGN PATENT DOCUMENTS 8605569  9/1986  PCT Int'l Appl. ............ 264/34

Primary Examiner—Karen Aftergut
Attorney, Agent, or Firm—Herbert Dubno; Andrew Wilford

[57] ABSTRACT

A method of repairing an underground large-diameter pipe having an inner surface includes first supporting with props inside the pipe spaced inward from its inner surface a lining having a shape conforming to that of the inner surface and then injecting a hardenable mass into the space between the inner surface and the lining and substantially completely filling this space with the mass. The mass is then cured and the props are removed. Then the cycle can be repeated for the next lining section. The lining is made of a durable synthetic resin, polyvinylchloride or high-density polyethylene.

3 Claims, 1 Drawing Sheet

METHOD FOR LINING LARGE-DIAMETER PIPES

FIELD OF THE INVENTION

The present invention relates to a system for lining conduits or pipes. More particularly this invention concerns a method of and apparatus for lining a pipe or conduit big enough for a man to work in.

BACKGROUND OF THE INVENTION

A standard underground sewer line is typically made of concrete pipe sections that when originally installed were thought to have a nearly endless service life due to the low activity of the waste water being conveyed. In recent times, however, waste water has become substantially more aggressive so that such concrete pipes are subject to attack and are in fact being damaged to the point where they can leak and pollute the surrounding ground water. Replacement is an extremely onerous task entailing excavating the conduit, removing it, and installing a new line of more resistant properties, typically of a synthetic resin. The damage to the surroundings entailed in digging out and replacing a sewer line is enormous, in particular in urban settings.

OBJECTS OF THE INVENTION

It is therefore an object of the present invention to provide an improved system for repairing a damaged large-diameter underground pipe.

Another object is the provision of such an improved system for repairing a damaged large-diameter underground pipe which overcomes the above-given disadvantages, that is which allows the pipe to be relined in situ.

SUMMARY OF THE INVENTION

A method of repairing an underground large-diameter pipe having an inner surface according to the invention comprises first supporting with props inside the pipe spaced inward from its inner surface a lining having a shape conforming to that of the inner surface and then injecting a hardenable mass into the space between the inner surface and the lining and substantially completely filling this space with the mass. The mass is then cured and the props are removed. Then the cycle can be repeated for the next lining section.

Thus with the system of this invention the pipe does not need to be excavated. Instead an access pit is dug for a carriage on which the props are mounted, and the relining is done for the whole pipe from this one site.

According to this invention the lining is made of a durable synthetic resin, polyvinylchloride or high-density polyethylene. It can be of the type with radially outwardly projecting and longitudinally extending T-section ribs that serve to anchor it solidly in the mass injected into the space.

The linings are tubular and in accordance with this invention the space is blocked at both ends of the lining during injection and curing of the mass around the first such lining to be installed. During installation of subsequent linings in longitudinal abutment at one end with the previously installed lining the space is blocked only at the opposite end during injection and curing, since the front end of the space will inherently be blocked by the earlier-installed lining.

During the injection air is vented from the space through holes in the lining and the mass is introduced into the space at its uppermost region so that it flows down, completely filling the space so that the finished mass has no voids. In addition before relining it is normally advisable to clean and smooth the inner surface of the pipe.

The apparatus according to this invention therefore ha a carriage provided with wheels and movable thereon along inside the pipe, a unit on the carriage for centering the carriage in the pipe, and radially displaceable props on the carriage for supporting inside the pipe spaced inward from its inner surface a lining having a shape conforming to that of the inner surface. The carriage is also provided with a nozzle for injecting a hardenable mass into the space between the inner surface and the lining and substantially completely filling this space with the mass so that when the mass is cured the carriage and props can be moved out of the pipe. The centering device includes a plurality of angularly generally equispaced wheels carried on the carriage and radially outwardly engageable with the pipe inner surface. In addition the carriage has front and rear ends each provided with a wheel and the wheel of the front end is pivotal up into the carriage. The carriage is provided at each end with seals positionable to axially block the space and the seal at the front end is removable. A controller is provided on the carriage for sequentially operating the centerer, props, and injector.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
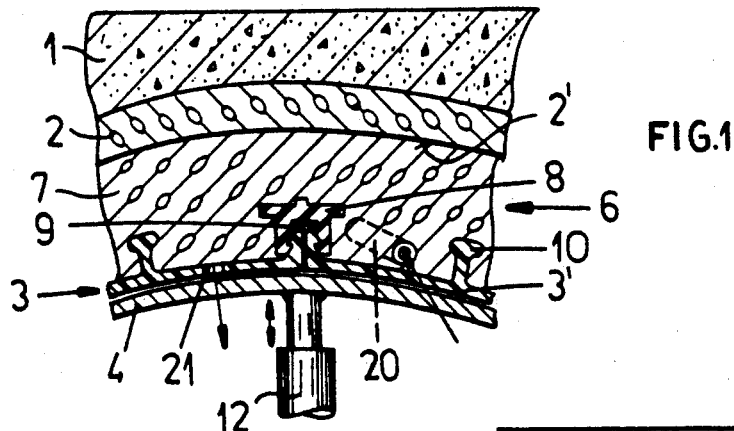
FIG. 1 is a cross section through a detail of a pipe being relined according to the invention.
Figure 3:
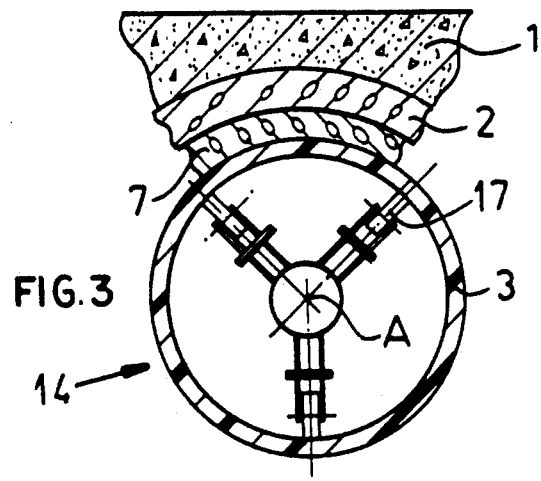
FIG. 3 is a section taken along line III—III of FIG. 2.
Figure 2:
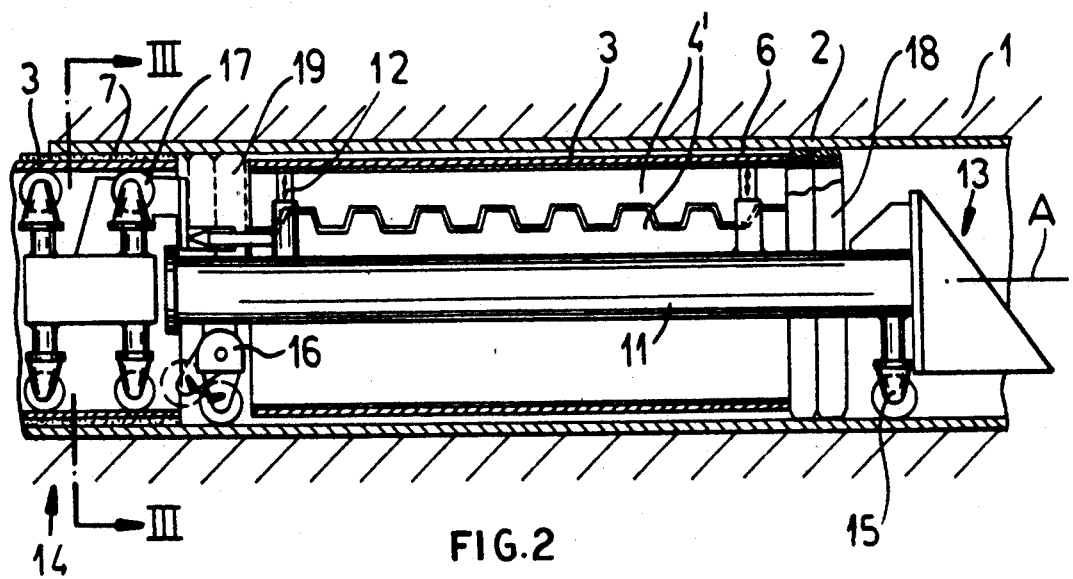
FIG. 2 is a small-scale longitudinal section through the pipe-lining apparatus of this invention in a pipe.

As seen in FIGS. 1 through 3 an existing cylindrically tubular pipe 2 having an inner surface 2' and a horizontal center axis A is buried in earth 1. This pipe 2 is typically made of concrete or cementitious material and can have an inside diameter of about 0.8 m. Although here shown to have a cylindrical inner surface, the pipe 2 could be of rectangular or other section without departing from the invention.

In accordance with this invention a plurality of part-cylindrical props 4' together forming a tubularly cylindrical prop 4 are supported by hydraulic actuators 12 on a body 11 of a carriage that is supported by back and front wheels 15 and 16 in the pipe 2. The body 11 also carries a controller 13 that operates the various actuators 12 and that can flip up the front wheels 16 as shown in dashed lines in FIG. 2. The front end of the carriage body 11 supports a centering device 14 comprised of a set of angularly spaced rollers 17 that can be braced against the inner surface 2' or against the inner surface of a previously installed lining 3 (See FIG. 3).

According to this invention the prop 4 supports lining sections 3' of the lining 3. The longitudinal seams between adjacent lining sections 3' are held together by clamps 8 and are sealed by elastomeric seals 9 as seen in FIG. 1. The outer surfaces of the lining sections 3' are formed with T-section outwardly projecting rails 10 and these sections 3' are about 2 m long.

To line a section of pipe 2, same is normally cleaned and smoothed. Then the carriage 11 is fitted with a plurality of lining sections 3' and is moved along the pipe 2 until it is at the end of the section to be lined or until it is just behind the previously lined section. If there is no previously lined section the front end of the carriage 11 is provided with an inflatable seal 19 that is positioned just ahead of the prop sections 4' and that can be inflated to engage the inner surface 2' snugly.

Once in a proper centered position as determined by the device 14 the rams 12 are expanded to position the prop sections 4', which have toothed interfitting edges as seen in FIG. 2, so that they hold the lining sections 3' solidly to define an annular space 6 with the inner pipe surface 2'. The front end of this space 6 is blocked either by the inflatable seal 19 or, in a situation where the lining section is being installed directly in back of a previously installed such lining section, by the rear end of the previously installed lining section, in which case the joint can be set up to permit some expansion. When the seal 19 is not used the front wheel 16 is folded up a shown in dashed lines so that it does not interfere with centering of the lining 3. The rear end of the space 6 is blocked by another such seal 18 that is always used.

Then a hardenable cementitious mass 7 is injected through a pipe 20 into the uppermost region of the space 6 to fill it with this mass 7, with any trapped air escaping through small vent holes 21 in the lining sections 3' This mass 7 can have a composition specifically determined for the particular site, and if desired reinforcement can be provided in the space 6 to span a break in the pipe 2. Once the mass 7 is cured, the seals 18 and 19 are deflated and the rams 12 contracted, and the carriage 11 can be pulled out, fitted with another set of lining sections 3', and sent back in to install them.

Thus with the system of this invention the pipe 2 can be lined without having to excavate its full length. All that is needed is a small access region big enough to move the carriage 11 into and out of. The new lining 3, which is normally of polyvinylchloride or high-density polyethylene, can be counted on to resist chemical attack and is much smoother than the surrounding concrete pipe 2 so that, even though it is of smaller flow cross section, the flow through it will be about as good as for the pipe 2.

I claim:

1. A method of repairing an underground large-diameter pipe having an inner surface and a horizontal center axis the method comprising the steps of sequentially:
   a) cleaning and smoothing the inner surface of the pipe;
   b) supporting with props carried on a movable carriage, inside the pipe and spaced inward from the inner surface of the pipe, a lining having a shape conforming to a shape of the inner surface and formed of a plurality of lining sections of a durable synthetic resin, the lining being tubular and forming with the inner surface an annular space having open ends;
   c) temporarily blocking both open ends of the space;
   d) injecting into an upper region of the space a hardenable mass, so that the mass flows down in the space and displaces air therein, and substantially completely filing the space with the mass while venting the displaced air through holes in the lining to prevent formation of voids in the mass;
   e) curing the mass into a first composite lining in which the lining sections are imbedded in the mass;
   f) unblocking the ends of the space and removing the props by moving the movable carriage located inside the pipe;
   g) moving the carriage to a second location adjacent the first composite lining and repeating step b), but with one end of the space being blocked by the first composite lining and only the other end of the space being open;
   h) temporarily blocking the other open end of the space and then repeating steps d) and e) in the space at the second location to form a second composite lining adjacent and contiguous with the first composite lining; and
   i) unblocking the other end of the space and removing the props by moving the movable carriage located inside the pipe.

2. The pipe-repair method defined in claim 1 wherein the resin is polyvinylchloride or high-density polyethylene.

3. The pipe-repair method defining in claim 1, further comprising in step b) the step of
   clamping together edges of the lining sections to form the lining sections into a rigid tube.

* * * * *